United States Patent Office 2,972,517
Patented Feb. 21, 1961

2,972,517

METHOD OF PRODUCING LITHIUM SULPHATE FROM ALPHA AND BETA SPODUMENE

James U. MacEwan, Montreal, Quebec, Canada, assignor to Department of Mines, Quebec, Quebec, Canada Filed Mar. 24, 1958, Ser. No. 723,459

9 Claims. (Cl. 23—121)

This invention relates to the treatment of spodumene in a continuous process to yield lithium sulphate.

Lithium salts are derived normally from spodumene as follows. In ore method spodumene ore or a concentrate is heated to above 1000° C., but below the fusion point of beta spodumene, to convert the alpha spodumene to the beta form, which is readily attacked by sulphuric acid. The beta spodumene is decomposed by mixing it intimately with sulphuric acid. The mixture is then heated to volatilize most of the excess sulphuric acid added for the decomposition. Then the charge is leached with added water to separate the soluble salts, i.e., lithium sulphate. The sulphate may then be converted to other salts, for example, the carbonate.

Another method is to decompose the spodumene by heating it along with limestone. The resulting decomposition product is then leached with dilute acid and the salts recovered.

A main disadvantage of these processes is their expense, mainly the cost of the sulphuric acid or the limestone, as the case may be, and of the fuel for heating.

Processes which have been suggested for other alkali aluminum silicates are useless for extracting spodumene since the latter is of significantly different constitution and does not respond to the same treatment. The applicant has, therefore, found that the response of spodumene to a given treatment cannot be logically predicted and must be determined by actual experiment.

APPLICANT'S DEVELOPMENT

The present invention makes it possible to decompose spodumene continuously using gaseous reactants in a solid-gas heterogeneous system with no liquid phase present at any time during the decomposition. Low cost gases are used with little excess and the residual heat in the hot gases leaving the decomposition zone can be in part recovered by heat exchange.

The applicant's process comprises passing over spodumene either in the alpha form of a size below 30 microns or in the beta form of any finely divided size suitable for gas-solid contact, i.e., preferably less than 20 mesh, a gaseous mixture of sulphur dioxide, oxygen and sulphur trioxide. The contact temperature is below about 900° C. and desirably not lower than about 700° C., preferably within the range from about 775° C. to about 825° C. The gas mixture and the spodumene are fed continuously into a closed reaction zone which can be, for example, a rotating kiln or a multi-hearth furnace in which the gas is continuously passed countercurrent to the solids. The treatment is carried on usually for a time within the range from about 1 to about 4 hours, preferably from about 3 to about 3½ hours. This results in the decomposition of the spodumene to form lithium sulphate and a water-insoluble residue which in the case of spodumene is believed to be cristobalite and mullite.

The gaseous reactants do not exceed the stoichiometric proportions by more than 200% by equivalent weight and are preferably in excess from about 50% to about 200% by equivalent weight. Gas-solid contact conditions are maintained by the fine subdivision of the spodumene and preferably by agitating the material constantly to bring the particle surfaces into contact with fresh gas. The flow of the gas as indicated by the amounts relative to the solids treated and the time of treatment is relatively slow. The lithium sulphate is recovered from the residue, for example, by leaching with water. The insoluble residue settles readily and is easily filtered. Spodumene contains alumina and silica and the invention contemplates the recovery of these constituents simultaneously with the recovery of lithium salts.

The gaseous mixture may be derived by passing sulphur dioxide and an oxygen-containing gas, preferably air, over a catalyst preferably at a temperature within the range from about 425° C. to about 600° C. The catalyst is of the type effective to convert sulphur dioxide to sulphur trioxide. Suitable catalysts are, for example, iron oxide, vanadium oxide or platinized asbestos. Nitrogen oxides, for example, generated by introducing vapours of nitric acid together with the mixture of sulphur dioxide and oxygen-containing gas can also be used, but in this case, the catalysis is performed at a lower temperature for example from about 110° C. to about 150° C. The applicant has also found that the chemical attack can be carried out in a shorter time by adding a nascent chlorine donor to the gas mixture after it leaves the catalyst and before it is applied to the charge or alternatively, by mixing a chlorine donor with the spodumene in the reaction chamber. By "chlorine-donor," the applicant means a substance (or substances) that provides at the site of the reaction nascent chlorine. Such substances suitable for addition to the gas mixture include, for example, ferric chloride, sulphuryl chloride, thionyl chloride. Substances suitable for mixture with the spodumene include sodium chloride, calcium chloride and the corresponding hypo chlorites, also bleaching powder ($CaOCl_2$).

Liquid sulphur dioxide may be employed. Or the sulphur dioxide may be generated, for example, by the burning of elemental sulphur or by the roasting of any metal sulphide (for example, pyrite, pyrrhotite or sphalerite) in the presence of air or oxygen.

The roasting or burning reactions will provide a suitable source of sulphur dioxide for the reactions and will liberate calories which can be used in part to heat the lithium bearing minerals and gas reactants to the proper range of temperature thus reducing the amount of fuel required for complete treatment. In all sources of sulphur dioxide there must be included free oxygen, which is available to unite with all or part of the sulphur dioxide to yield sulphur trioxide. The roasting reaction will liberate heat and this heat can be used to raise the temperature of the lithium-bearing materials and gaseous reactants to the range where the rate of attack of these materials by sulphur trioxide and/or a mixture of sulphur dioxide and oxygen-bearing gas is increased. The utilization of the heat from the roasting reaction will eliminate or greatly reduce the amount of fuel required for treatment. In all methods of treatment agitation or stirring of the solid materials while in contact with the reacting gases will increase the recoveries and shorten the time of reaction.

The invention will now be further described in further detail by reference to a detailed description including specific examples and to the accompanying drawings in which.

The following examples illustrate typical runs according to the invention.

EXAMPLE I 1000 grams of a beta-spodumene concentrate (analyzing 5.32% lithium oxide ($Li_2O$)) were treated for 4 hours with a gas mixture of about 50% sulphur dioxide and about 50% oxygen after passing this gas mixture over a catalyst at 450° C. The time of contact of the gases and solids was 4 hours and the temperature in the reaction zone of solids and gases was 800° C.

After cooling, the recovery, as water-soluble lithium sulphate, was 87% of the total lithium present and the residue was identified, by X-ray diffraction pattern, as cristobalite and mullite.

The graphs

Figure 1:
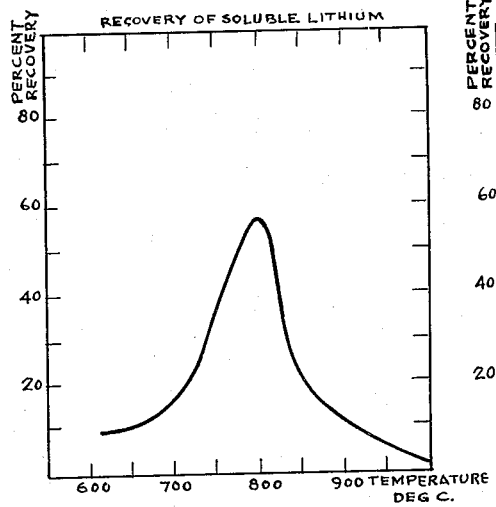
Figure 1 is a graph illustrating the effect of temperature on recovery at 1 hour.

Reference will now be made of Figure 1. The graph shows the effect of temperature variations for runs of 1 hour duration. The procedure followed was as above described except for the time. The material tested was beta spodumene concentrate. The catalyst was platinized asbestos. The gases were sulphur dioxide (24 cubic centimeters per minute) and oxygen (25 cubic centimeters per minute).

It will be noted that recovery climbs rapidly starting at 700° C. to a peak at about 800° C. and then falls off rapidly again.

Figure 2:
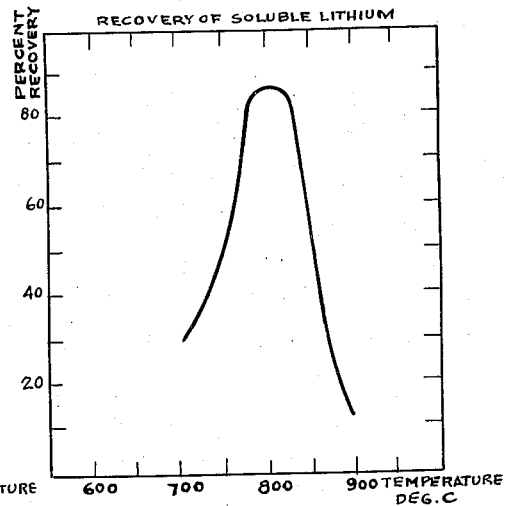
Figure 2 is a graph illustrating the effect of temperature on recovery at 4 hours.

Figure 2 shows the effect of temperature in runs of 4 hours' duration. The materials employed were the same as in Figure 1. The only difference was the time of the runs. The procedure is that of Example 1. It is noted that Graph 2 is similar to that of Figure 1 with the exception that the recovery was better being 87% as given above.

EXAMPLE II 1000 grams of a finely ground alpha-spodumene concentrate (of particle size minus 30 microns, average 5 microns) (analyzing 7.4% lithium oxide ($Li_2O$)) were treated for 4 hours with a gas mixture of about 50% sulphur dioxide and about 50% oxygen after passing this gas mixture over a catalyst at 450° C. The time of contact of the gases and solids was 4 hours and the temperature of solids and gases was 750° C.

After cooling the recovery of water-soluble lithium oxide was 72%.

EXAMPLE III

A mixture of 100 parts of a spodumene concentrate previously decrepitated (analyzing 6.35% $Li_2O$, lithium oxide) and 33 parts sodium chloride were treated in a stationary bed with a gas mixture of 67% sulphur dioxide and 33% oxygen. The mixture of gases were passed over platinized asbestos at 450° C. as a catalyst. The temperature in the reaction zone was 800° C. and the time of contact of the gases and solids was 1 hour.

The recovery of water-soluble lithium was 93.9%.

Figure 3:
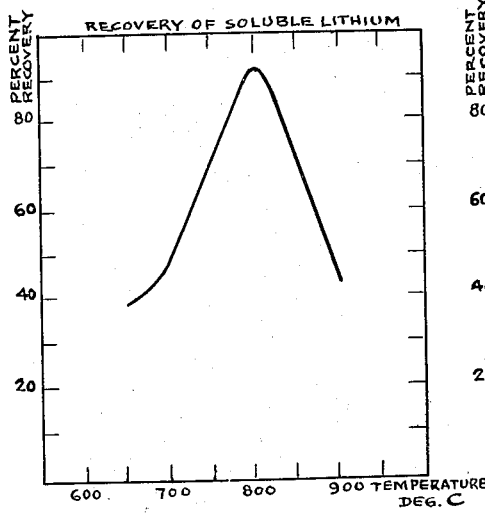
Figure 3 is a graph illustrating the effects of temperature at 1 hour in the presence of sodium chloride.

Figure 3 illustrates the effect of sodium chloride. The amount added was stochiometrically equivalent to the lithium present. The runs were similar to Figure 1 with the exeption that sodium chloride was present in the charge. It is to be noted that the time is the same as that of Figure 1 and the recovery at the same temperature was considerably higher. The recovery pattern varied similarly with temperature to that of Figure 1 with the exception that in all cases better recovery was effected.

EXAMPLE IV

A mixture of 100 parts of alpha spodumene (non-decrepitated) concentrate of a size minus 30 microns, average 5 microns (analyzing 6.9% lithium oxide) and of 33 parts sodium chloride was treated in a stationary bed with a gas mixture of 855 parts of sulphur dioxide and of 428 parts of oxygen. The mixture of gases was passed over platinized asbestos at 450° C. as catalyst. The temperature in the reaction zone was 800° C. and the time of contact between gases and solids was one hour. The recovery of water-soluble lithium sulphate was 77.1%.

Figure 4:
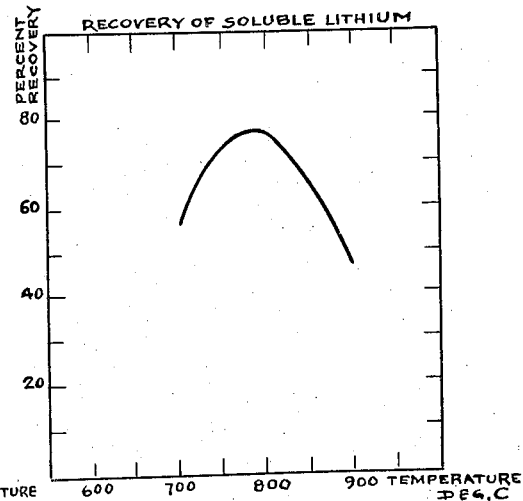
Figure 4 is a graph illustrating an effect similar to that of Figure 3, with the exception that a finely divided alpha spodumene is employed as the starting material.

Reference will now be made to Figure 4 which is based on data accumulated from runs similar to that of Example IV. The gases employed were sulphur dioxide (25 cubic centimeters per minute) and oxygen (25 cubic centimeters per minute). The time was one hour in each test. The graph shows recovery plotted against varying temperatures.

The reactions involved in the above procedures are:

For sulphur dioxide—

$$2FeS_2 + 5\tfrac{1}{2}O_2 = Fe_2O_3 + 4SO_2$$
$$Li_2O.Al_2O_3.4SiO_2 + SO_2 + \tfrac{1}{2}O_2 + \text{high temperature}$$
(above 750° C.) $= Li_2SO_4 + \tfrac{1}{3}(3Al_2O_3.2SiO_2) + 10\tfrac{1}{3}SiO_2$ or $$Li_2O.Al_2O_3.4SiO_2 + 4SO_2 + 2O_2 \text{ medium temperature}$$
(below 750° C.) $= Li_2SO_4 + Al_2(SO_4)_3 + 4SiO_2$ For sulphur dioxide and sodium chloride—

$$2FeS_2 + 5\tfrac{1}{2}O_2 = Fe_2O_3 + 4SO_2$$
$$2NaCl + SO_2 + O_2 = 2Cl \text{ (nascent)} + Na_2SO_4$$
$$Li_2O.Al_2O_3.4SiO_2 + 2Cl \text{ (nascent)} = 2LiCl + \text{ an amorphous insoluble residue}$$

or $$Li_2O.Al_2O_3.4SiO_2 + 8Cl \text{ (nascent)} = 2LiCl + 2AlCl_3 + 4SiO_2 + 4O \text{ (nascent)}$$

The lithium chloride can react further with sulphur dioxide and oxygen.

$$2LiCl + SO_2 + O_2 = 2Cl \text{ (nascent)} + Li_2SO_4$$

and this liberated nascent chlorine will attack unreacted spodumene.

Other reactions involved are as follows:

$$4FeS_2 + 11O_2 = 2Fe_2O_3 + 8SO_2 + 473,400 \text{ calories}$$
$$(x+y)SO_2 + y/2O_2 = ySO_3 + xSO_2 + \text{calories}$$

It is recommended that the proportion of sulphur dioxide to free oxygen be in the ratio of two volumes of sulphur dioxide to one volume of free oxygen. An excess of oxygen will not be objectionable.

The amount of sulphur oxides of sulphur in the reacting gases can vary from the theoretical amount to 600% excess.

For example the theoretical amount is:

$$Li_2O.Al_2O_3.4SiO_2 + SO_2 + \tfrac{1}{2}O_2 = Li_2SO_4 + Al_2O_3 + 4SiO_2$$

or $$Li_2O.Al_2O_3.4SiO_2 + 4SO_2 + 2O_2 = Li_2SO_4 + Al_2(SO_4)_3 + 4SiO_2$$

The chlorine added in the form of chlorides should be equivalent to the recoverable metals as a maximum.

DESCRIPTION OF VARIABLE FACTORS

Starting materials

Normally the spodumene ore is crushed to minus 35 mesh and concentrated by flotation. This concentrate is alpha spodumene and normally will contain from 5.5 to 7.5% $Li_2O$. This is converted to the beta modification by heating to above 860° C. to cause this conversion or, as it is commonly called "decrepitation." This operation can be carried out in any suitable furnace such as a muffle furnace, kiln or fluidized bed reactor. With kilns and fluidized bed reactors, an adequate dust recovery unit must be included to recover the fine particles carried out of the furnace by the gas stream. Differential thermal analysis and X-ray studies have shown us that it is not necessary to heat the spodumene to above 1000° C. according to usual practice. For example, minus 35 mesh spodumene concentrates are converted to the beta form in a short time after being brought to a temperature above 860° C. No particular benefit is derived through heating the material throughout, whatever its size, above 925° C. A period of thirty minutes at temperature is usually adequate to convert the coarser particles and a much shorter time for the finer particles. Alpha spodumene of a particle size minus 30 microns does not have to be decrepitated, but can be treated directly.

Quantities

It is recommended that the maximum ratio of sulphur dioxide to free oxygen introduced into the process be about 2 to 1 by volume. Theoretically, 1 mol of spodumene (372 grams) is equivalent to 1 mol of sulphur dioxide (64 grams). In practice, the amount of gaseous reactants needed do not exceed the stoichiometric proportions by more than 200% by equivalent weight, and preferably from 50% to about 200% excess by equivalent weight.

Operative ranges of quantities of the primary materials introduced into the process are between about 17% and about 35% by weight of sulphur dioxide on the dry spodumene, from about 8% to about 18% of oxygen calculated as free oxygen, by dry weight on the spodumene. It should be explained that when sulphur dioxide and an oxygen-containing gas is passed over a catalyst at a given temperature, there is obtained a gaseous mixture of sulphur dioxide, sulphur trioxide, and oxygen at or slightly less than, but never in excess of, equilibrium concentrations for the particular temperature. Therefore, temperature governs the relative amounts of sulphur dioxide and sulphur trioxide present in the reaction zone. Accordingly, if, for example, sulphur trioxide were introduced into the reaction zone, some of it would break down to sulphur dioxide. The above amounts are those calculated of primary materials introduced into the process.

Technology of the process

According to one of its preferred aspects, the process consists in conducting the hot gases with or without cleaning from pyrite kilns of the usual type through catalytic chambers of conventional type, then through convenient closed chambers, for example, kilns or reactors charged with the spodumene ores or concentrates.

The travel of the hot gases from the catalytic chambers is preferably arranged in such manner that the gaseous reactants contact the beta spodumene in a counter-current manner by which the material which has been exposed to the gases for the longest time meets strong fresh gases, while the nearly exhausted gases are brought into contact with fresh beta spodumene. In this way, on the one hand, the spodumene is completely converted into sulphate and, on the other hand, the pyrite kiln gases are nearly fully utilized. This reaction will be enhanced if the gases are under a positive pressure of one half to three atmospheres.

The products of the above gaseous treatment are leached with water to dissolve the lithium sulphate. The leaching is best done on a counter-current basis in tanks or agitators with the solution richest in dissolved lithium salts being brought in contact with unleached material. The solution from this step will be withdrawn from the circuit and processed by known means for lithium salts recovery.

The solid material from this first leaching is preferably further leached by a series of aqueous solutions of decreasing lithium content until the lithium salts are dissolved to the economic limit and then the solids water washed. These various solutions, as they become richer in lithium will be used to leach solids of higher lithium contents, as is practiced in counter-current leaching.

This application is a continuation-in-part application of application Serial No. 608,528, filed September 7, 1956, and now abandoned.

I claim:

1. A process for recovering lithium sulphate comprising passing over a finely divided solid material selected from the group consisting of alpha spodumene having a particle size of less than 30 microns and beta spodumene in a reaction zone heated to a temperature within the range from about 700° C. to about 900° C., a gaseous mixture of sulphur dioxide, oxygen and sulphur trioxide for a time within the range from about 1 to about 4 hours thereby to bring about a gas-solid contact reaction to form lithium sulphate and a water-insoluble residue, and recovering the lithium sulphate from the residue.

2. A process as defined in claim 1 in which the temperature is within the range from about 775° C. to about 825° C.

3. A process as defined in claim 1 in which the reaction is carried out for a time within the range from about 3 to about 3½ hours.

4. A process as defined in claim 1 wherein the gaseous reactants are in excess of the stoichiometric proportions from about 50% to about 200% by equivalent weight.

5. A process as defined in claim 1 in which the finely divided solid material is continuously agitated and the gas is circulated in intimate contact with the agitated charge.

6. A process for recovering lithium sulphate comprising introducing into a closed reaction zone a finely divided material selected from the group consisting of alpha spodumene having a particle size of minus 30 microns and beta spodumene, maintaining the reaction zone at a temperature within the range from about 700° C. to about 900° C. while introducing into said zone a gaseous mixture of sulphur dioxide, oxygen and sulphur trioxide whereby the spodumene is contacted with gas for a time within the range from about 1 hour to about 4 hours so as to form lithium sulphate and a water-insoluble residue, the amount of gas introduced exceeding the stoichiometric proportions by about 50% to about 200% equivalent weight, the spodumene being agitated and the gas circulated in contact with the agitated spodumene, and recovering the lithium sulphate from the residue.

7. A process as defined in claim 1 in which the finely divided material is beta spodumene.

8. A process as defined in claim 6 in which the finely divided material is beta spodumene.

9. A process of producing lithium sulphate comprising passing a gaseous mixture of sulphur dioxide and air over a catalyst effective to convert sulphur dioxide to sulphur trioxide, and passing the resulting gaseous mixture into contact with a finely divided material selected from the group consisting of alpha spodumene having a particle size less than 30 microns and beta spodumene in a reaction zone heated to a temperature within a range from about 700° C. to about 900° C. thereby to bring about a gas-solid contact reaction to form lithium sulphate and a water insoluble residue, and recovering the lithium sulphate from the residue.

References Cited in the file of this patent

UNITED STATES PATENTS

| | | |
|---|---|---|
| 1,315,761 | Coolbaugh | Sept. 9, 1919 |
| 1,323,464 | Glaeser | Dec. 2, 1919 |
| 2,036,015 | Broderick et al. | Mar. 31, 1936 |
| 2,516,109 | Ellestad et al. | July 25, 1950 |